United States Patent
Yamanaka et al.

(10) Patent No.: US 6,738,272 B2
(45) Date of Patent: May 18, 2004

(54) CHARGE PUMP RUSH CURRENT LIMITING CIRCUIT

(75) Inventors: Junko Yamanaka, Chiba (JP); Toshiki Ishii, Chiba (JP); Katsunori Kimura, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 10/124,354

(22) Filed: Apr. 16, 2002

(65) Prior Publication Data

US 2002/0154524 A1 Oct. 24, 2002

(30) Foreign Application Priority Data

Apr. 24, 2001 (JP) .................................. 2001-126418
Apr. 26, 2001 (JP) .................................. 2001-129892
Aug. 6, 2001 (JP) .................................. 2001-237367

(51) Int. Cl.[7] ................................. H02M 3/18
(52) U.S. Cl. ..................... 363/60; 363/49; 323/908
(58) Field of Search ..................... 323/901, 908; 363/49, 59, 60; 327/536, 537; 361/93.9; 307/110, 135

(56) References Cited

U.S. PATENT DOCUMENTS 5,694,308 A * 12/1997 Cave ........................... 363/59

* cited by examiner

Primary Examiner—Michael Sherry
Assistant Examiner—Gary L. Laxton
(74) Attorney, Agent, or Firm—Adams & Wilks

(57) ABSTRACT

In a charge pump circuit, a constant current circuit is disposed between an input power supply and an output capacitor, when a power supply is started to turn on, the operation of the charge pump circuit is stopped, and the output capacitor is charged up to a given voltage by the constant current circuit, and thereafter the normal operation of the charge pump is started to limit the rush current. When the power supply is started, the operation is conducted by an oscillator circuit having a small duty ratio, and thereafter the control is replaced by the PFM control having the normal duty ratio, to thereby reduce the rush current as compared with that of the conventional PFM control. When the power supply is started, a pre-driver including a current limiting element is used to drive a driver, resulting in such an advantage that the rush current is reduced as compared with that driven by the conventional pre-driver.

15 Claims, 4 Drawing Sheets

US 6,738,272 B2

CHARGE PUMP RUSH CURRENT LIMITING CIRCUIT

BACKGROUND OF THE INVENTION

1. Field of the Invention

The present invention relates to a charge pump rush current limiting circuit that limits a rush current in a charge pump circuit.

2. Description of the Related Art

In a conventional charge pump circuit, at the time of starting the supply of an input current from an input power supply to an output capacitor there is charqe in the output capacitor. Also, since the duty ratio of the charge pump under PFM control is kept constant, and a square wave is used in an oscillation pulse that allows a switch to turn on/off, a large rush current flows when the power supply is started.

However, in the conventional charge pump circuit, when the large rush current is generated when the power supply is started the result is that a voltage across the input power supply is dropped, and there is a fear that another circuit that is connected to the same input power supply as that of the charge pump malfunctions.

SUMMARY OF THE INVENTION

The present invention has been made to solve the above problem with the conventional device, and therefore an object of the present invention is to prevent another circuit connected to the same input power supply as that of a charge pump circuit from malfunctioning by limiting a rush current in such a manner that the operation of the charge pump circuit is stopped, and the voltage is charged up to a voltage of an output capacitor by the constant current circuit and thereafter a normal operation of the charge pump is started when a power supply is started, by limiting a rush current in such a manner that the duty ratio of the PFM operation is changed when the power supply is started, or alternatively, by employing a chopping wave or a sine wave as a pulse when a switch is turned on.

In order to achieve the above object, according to the present invention, a constant current circuit is disposed between an input power supply and an output capacitor, and when the power supply is started, the operation of the charge pump circuit is stopped, the output capacitor is charged up to a given voltage by the constant current circuit, and thereafter the normal operation of the charge pump is started. Alternatively, when the power turns on, the charge pump circuit is operated due to an oscillator circuit small in the duty ratio to limit the rush current, or a peak current value is averaged by using a chopping wave or a sine wave for a pulse that turns on the switch when the power is started.

In the conventional charge pump circuit, no charge exists in the output capacitor when the power supply is started. Therefore, there is a fear that the rush current flows in the output capacitor, the input voltage rapidly drops due to an impedance of the input power supply, and another circuit connected to the same input power supply malfunctions. In the present invention, the load capacitor is charged through the current limiting circuit without conducting the normal operation of the charge pump while the voltage across the output capacitor reaches a given voltage when the power supply is started. Therefore, the rush current does not flow until the voltage across the load capacitor reaches the given voltage, and the normal operation of the charge pump is conducted when the voltage across the load capacitor exceeds the given voltage. In this situation, a constant amount of charges has been already charged in the load capacitor, with the result that the amount of rush current becomes small as compared with a case in which no charge is charged in the output capacitor, to thereby suppress a drop of the supply voltage due to the impedance of the input power supply to be small and eliminate the malfunction of another circuit connected to the same input power supply.

An oscillator circuit having a small duty ratio is added to the circuit structure of the PFM control in the conventional DC/DC converter charge pump to integrate the oscillator circuits of two systems into the circuit. The charge pump circuit has an oscillator circuit which controls the charging operation of a pump capacitor by changing a frequency of a charging control signal while maintaining a constant pulse width thereof, and discharges the pumping capacitor to an output capacitor during discharging cycle. When the power supply is started, the circuit is operated by the oscillator circuit having a small duty ratio so that the amount of charges that are charged in the pumping capacitor and the output capacitor are reduced, to thereby make the rush current smaller than that started under the normal PFM control. Thereafter, when the output voltage reaches a given value, the oscillator circuit that is operating when the power supply is started is stopped, and then automatically changed over to the oscillator circuit having the normal duty ratio, to thereby conduct the PFM control.

Another pre-driver circuit in which a current is limited by a current limiting element is integrated into the conventional circuit structure of a pre-driver that turns on the switch of the charge pump so as to include the pre-driver circuits of the two systems integrated thereinto, and the switch is turned on by the pre-driver circuit in which a current is limited when the power supply is started, to thereby slowly turn on the switch, and a peak value of the rush current that is turned on by the normal square wave is decreased. Thereafter, when the output voltage reaches a given value, the pre-driver circuit that is operating when the power supply is started is stopped and automatically changed over to the normal pre-driver circuit, thereby turning on/off the switch.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1:
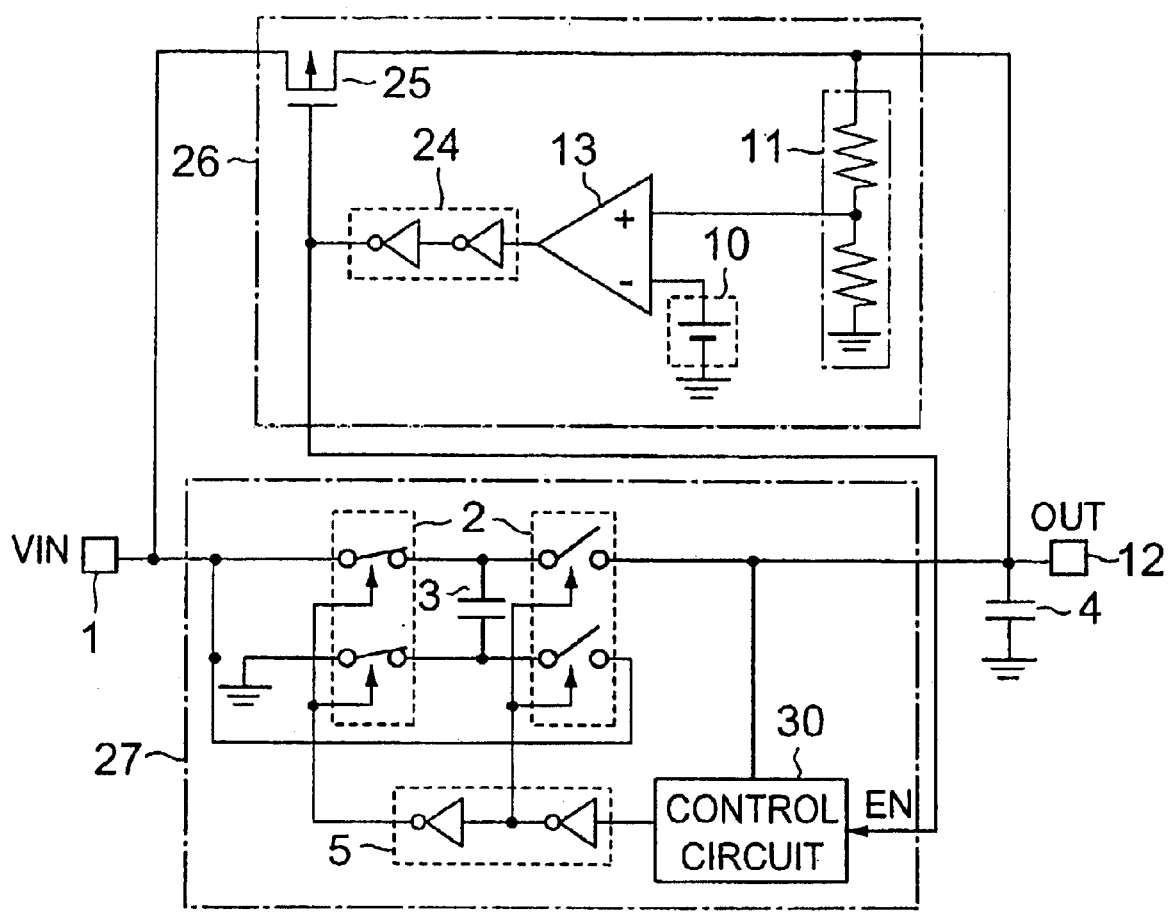
FIG. 1 is a structural diagram showing a charge pump rush current limiting circuit in accordance with claim 2 of one embodiment of the present invention.

Below, a description will be given in more detail of a charge pump rush current limiting circuit in accordance with preferred embodiments of the present invention with reference to the accompanying drawings. FIG. 1 is a structural diagram showing a charge pump rush current limiting circuit in accordance with one embodiment of the present invention. The charge pump rush current limiting current includes a charge pump circuit 27 including a driver 2 that supplies charges to a pumping capacitor 3 and an output capacitor 4, a pre-driver 5 that drives the driver 2, and a control circuit 30, and a current limiting circuit 26 including a detection resistor 11, a reference voltage 10, a comparator 13, a buffer 24 and a transistor 25.

Figure 2:
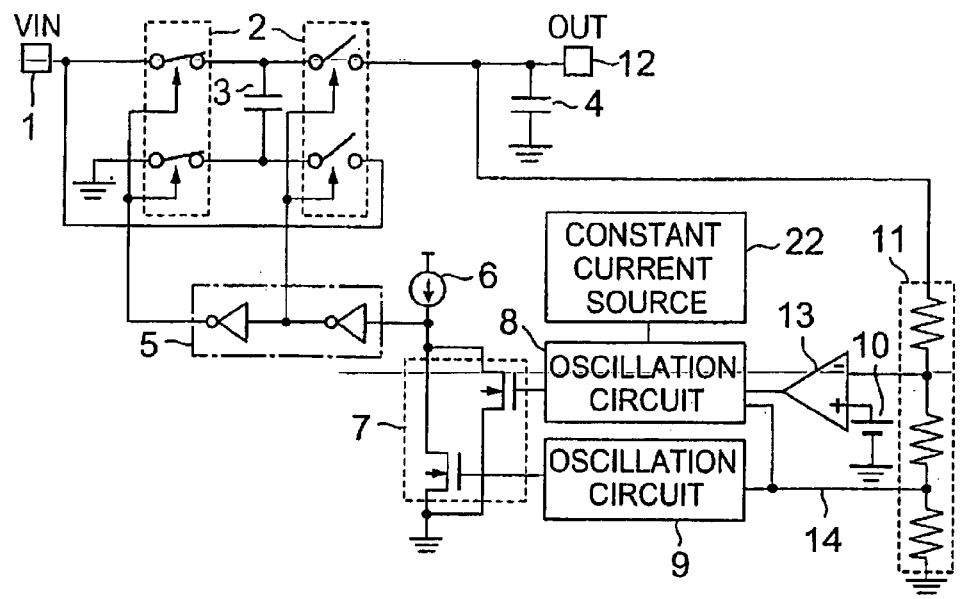
FIG. 2 is a structural diagram showing a charge pump rush current limiting circuit in accordance with claim 4 of another embodiment of the present invention.
Figure 3:
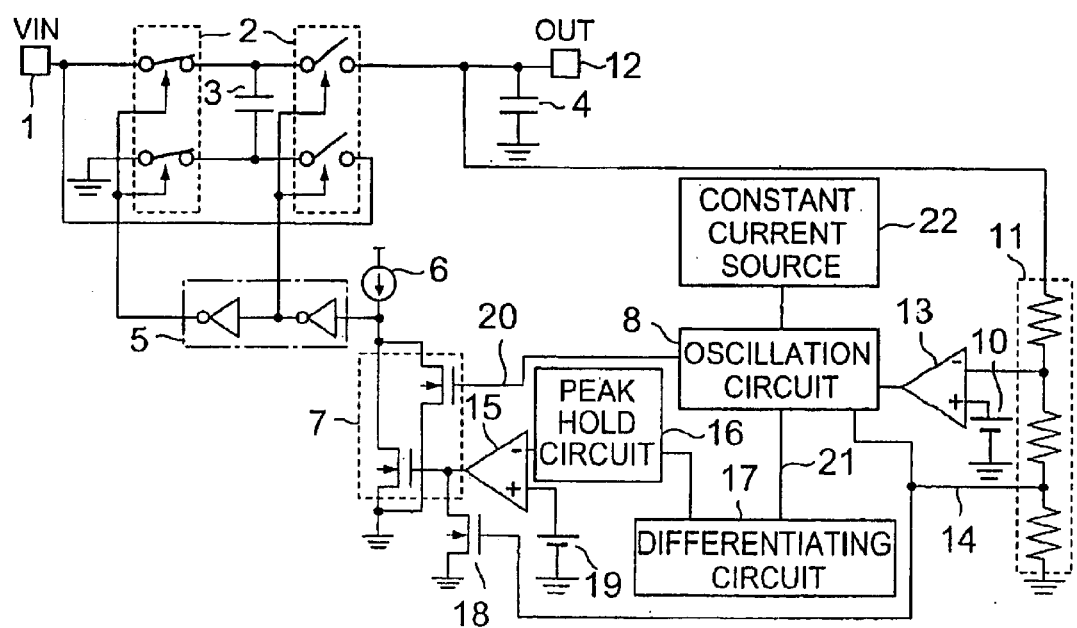
FIG. 3 is a structural diagram showing a charge pump rush current limiting circuit in accordance with claim 5 of still another embodiment of the present invention.
Figure 4:
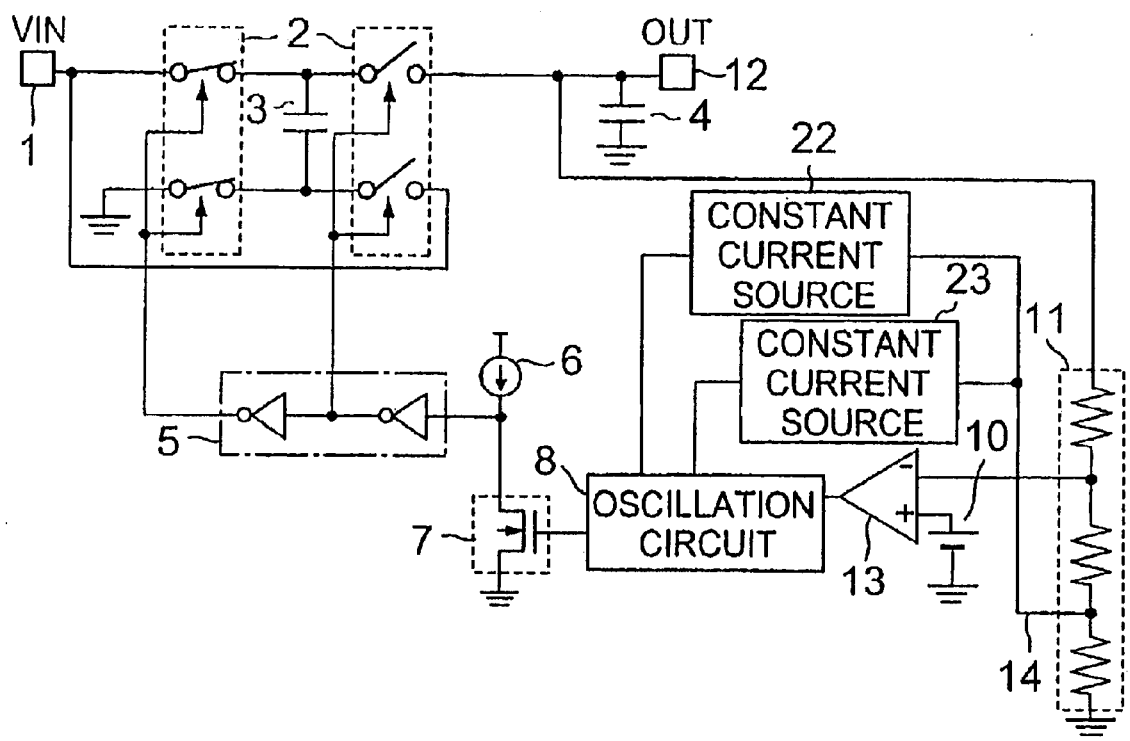
FIG. 4 is a structural diagram showing a charge pump rush current limiting circuit in accordance with claim 6 of yet still another embodiment of the present invention.

FIGS. 2, 3 and 4 are structural diagrams showing a charge pump rush current limiting circuit in accordance with another embodiment of the present invention. The charge pump rush current limiting circuit includes a driver 2 that supplies charges to a pumping capacitor 3 and an output capacitor 4, a pre-driver 5 that drives the driver 2, a detection resistor 11, reference voltages 10 and 19, comparators 13 and 15, an oscillator circuit 8 having a large duty ratio, an oscillator circuit 9 having a small duty ratio, constant current sources 6, 22 and 23, switching transistors 7 and 18, a peak hold circuit 16, and a differentiating circuit.

Figure 5:
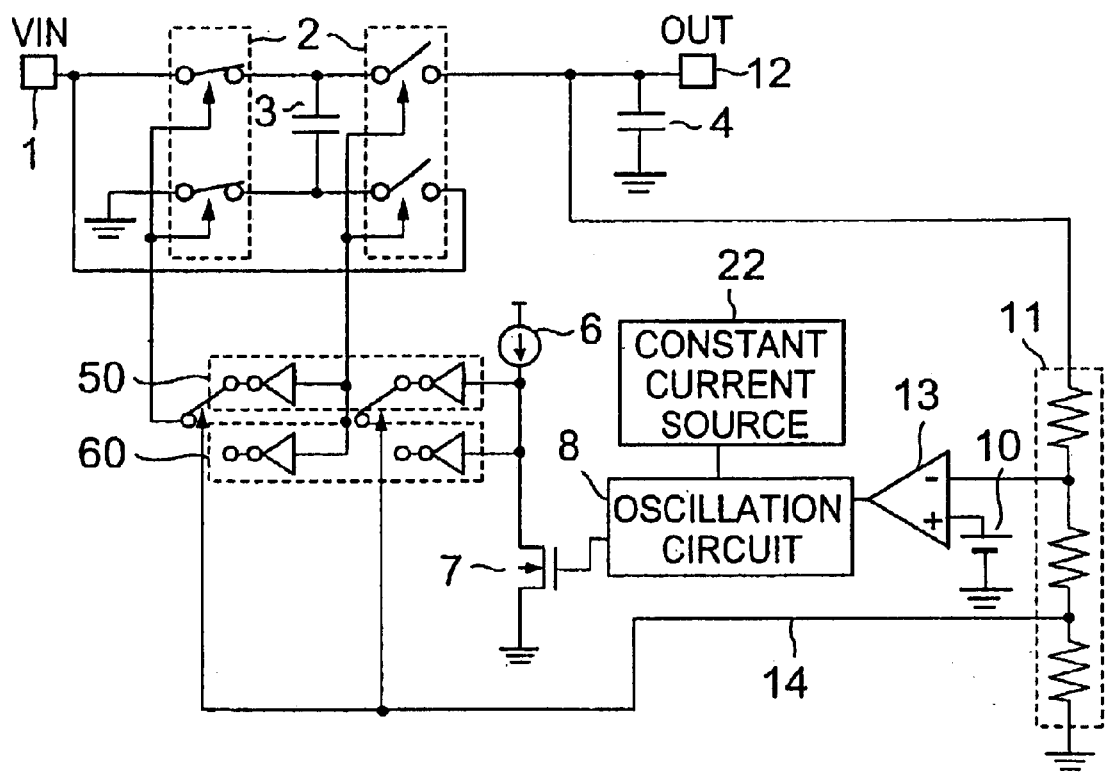
FIG. 5 is a structural diagram showing a charge pump rush current limiting circuit in accordance with claim 8 of yet still another embodiment of the present invention.

FIG. 5 is a structural diagram showing a charge pump rush current limiting circuit in accordance with still another embodiment of the present invention. The charge pump rush current limiting circuit includes a driver 2 that supplies charges to a pumping capacitor 3 and an output capacitor 4, a pre-driver 50 that drives the driver 2, a pre-driver 60 including a current limiting element that drives the driver 2, a detection resistor 11, a reference voltage 10, a comparator 13, an oscillator circuit 8, constant current sources 6 and 22, and a switching transistor 7.

First, the operation of the charge pump rush current limiting circuit shown in FIG. 1 will be described. At a starting time where a voltage is applied to a power supply terminal 1, the voltage at an output terminal 12 is a GND level, and an output of the buffer circuit 24 becomes an "L" level. In this situation, the transistor 25 is turned on, and the charge pump circuit 27 stops. The saturation current of the transistor 25 is as small as no rush current is generated, therefore, the input power supply is stabilized, and a drop of the supply voltage due to the input impedance does not occur. In this state, the output capacitor is charged. When the output terminal voltage reaches a given voltage, for example, a voltage of 90% of the input voltage, the comparator 13 is inversed, and the output of the buffer circuit 24 becomes an "H" level. Then, the transistor 25 is turned off, the charge pump circuit 27 is brought into operation, and the normal operation of the charge pump is started. In this situation, the terminal voltage across the output capacitor reaches 90% of the input voltage, accordingly, even if the normal operation of the charge pump is conducted, the rush current is suppressed to be small as compared with a case in which a voltage of the output terminal 12 is GND. Therefore, a drop of the supply voltage due to the impedance of the input power supply is also suppressed to be small, and there is no fear that another circuit connected to the same input power supply malfunctions.

Subsequently, the operation of the charge pump rush current limiting circuit shown in FIG. 2 will be described.

In a starting time where voltage is applied to a power supply terminal 1, the voltage at an output terminal 12 is GND level, and through implementation of the operation, an oscillator circuit 9 is operated but another oscillator circuit 8 is not. Also, the output of the oscillator circuit 8 is "L" level, and the switching transistor 7 is turned off. The oscillator circuit 9 under operation has a cycle having a small duty ratio, with the result that the amount of charges that are supplied to the pumping capacitor 3 and the output capacitor 4 are small, to thereby suppress the rush current. Thereafter, a voltage is developed at the output terminal 12, and a voltage is developed at a resistor dividing output 14 such that the oscillator circuit 9 is stopped and another oscillator circuit 8 is operated, thereby to be replaced by the PFM control having the normal duty ratio.

Subsequently, the operation of the charge pump rush current limiting circuit shown in FIG. 3 will be described.

In a starting time where a voltage is applied to a power supply terminal 1, the voltage at an output terminal 12 becomes GND level, and through implementation of the operation, an oscillator circuit 8 operates but the oscillator circuit output 20 outputs "L" level, and the oscillator circuit output 21 outputs a normal cycle signal. The cycle signal having a small duty ratio is produced by a differentiating circuit 17, a peak hold circuit 16, a comparator 15 and a reference voltage 19 on the basis of the cycle signal, to operate the charge pump. For that reason, the amount of charges that are supplied to a pumping capacitor 3 and an output capacitor 4 are small, to thereby suppress the rush current. Thereafter, a voltage is developed at the output terminal 12, and a voltage is developed at a resistor dividing output 14 such that a switching transistor 18 is turned on and the oscillator circuit output 20 outputs a cycle signal having the normal duty ratio, to thereby to be replaced by the original PFM control.

Subsequently, the operation of the charge pump rush current limiting circuit shown in FIG. 4 will be described.

In a starting time where a voltage is applied to a power supply terminal 1, the voltage at an output terminal 12 becomes GND level, and in an oscillation circuit 8, a cycle signal having a small duty ratio is produced by the constant current source 23, to thereby operate the charge pump. For that reason, the amount of charges that are supplied to a pumping capacitor 3 and an output capacitor 4 are small, to thereby suppress the rush current. Thereafter, a voltage is developed at the output terminal 12, and a voltage is developed at a resistor dividing output 14 such that the constant current source 23 is replaced by a constant current source 22, to thereby to operated through the PFM control having the normal duty ratio.

Subsequently, the operation of the charge pump rush current limiting circuit shown in FIG. 5 will be described.

In a starting time where a voltage is applied to a power supply terminal 1, the voltage at an output terminal 12 becomes GND level, and through implementation of the operation, a pre-driver circuit 60 is connected to a driver but another pre-driver 50 is not. The connected pre-driver circuit 60 includes a current limiting element, therefore, a driver 2 is slowly turned on with the result that the amount of charges that are supplied to a pumping capacitor 3 and an output capacitor 4 are small to suppress the rush current. Thereafter, a voltage is developed at the output terminal 12, and a voltage is developed at a resistor dividing output 14 such that the pre-driver circuit 60 is cut off, and another pre-driver circuit 50 is connected thereto, to turn on/off the switch by the normal pre-driver 50.

As was described above, according to the present invention, when the power supply is started, the operation of a charge pump circuit is stopped, and an output capacitor is charged up to a given voltage by a constant current circuit disposed between the input power supply and the output capacitor, and thereafter the normal operation of the charge pump is started to limit the rush current, as a result of which there is effected on that a voltage of the power supply system connected to the power supply that is common to the charge pump circuit is prevented from malfunction that is caused by drops thereof.

Also, when the power supply is started, the operation is conducted under the PFM control operated by the oscillator circuit having a small duty ratio, therefore, there is advantageous in that the rush current is reduced as compared with that under the conventional PFM control.

Further, when the power supply is started to turn on, a pre-driver including a current limiting element is used to drive the driver, accordingly, there is advantageous in that the rush current is reduced as compared with that driven by the conventional pre-driver.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A charge pump rush current limiting circuit for limiting a rush current from flowing in a charge pump circuit, the charge pump rush current limiting circuit comprising: a switching element disposed between an input power supply of the charge pump circuit and an output capacitor of the charge pump circuit; and a feedback circuit connected between the output capacitor and the switching element for preventing the charge pump circuit from operating when the power supply is initially started by controlling the switching element to charge the output capacitor from the input power supply and permitting the charge pump circuit to operate when the voltage of the output capacitor reaches a predetermined value, to thereby limit a rush current from flowing in the charge pump circuit.

2. A charge pump rush current limiting circuit according to claim 1; wherein the switching element comprises a current limiting transistor, and the feedback circuit comprises a detection resistor connected to the output capacitor for producing a detection voltage, a reference voltage, and a comparator for comparing the reference voltage and the detection voltage and outputting a comparison signal for preventing operation of the charge pump circuit by turning on the current limiting transistor until the detection voltage reaches the predetermined value.

3. In a DC/DC converter charge pump circuit having a pumping capacitor that is charged during a charging cycle by a PFM control circuit having an oscillator circuit which controls the charging operation of the pumping capacitor by changing a frequency of a charging control signal while maintaining a constant pulse width thereof, and discharges the pumping capacitor to an output capacitor during a discharging cycle, a charge pump rush current limiting circuit for limiting a rush current from flowing in the charge pump circuit, comprising: a circuit for reducing the charging cycle period at the time of starting the charge pump circuit to reduce a rush current.

4. A DC/DC converter charge pump circuit according to claim 3; wherein the circuit for reducing the charging cycle period comprises a second oscillator circuit which produces a shortened charging cycle period when a power supply of the charge pump circuit is started.

5. A DC/DC converter charge pump circuit according to claim 3; wherein the circuit for reducing the charging cycle period comprises a circuit which changes an output pulse of the oscillator circuit when the power supply of the charge pump circuit is started.

6. A DC/DC converter charge pump circuit according to claim 3; wherein the circuit for reducing the charging cycle period comprises a constant current source which changes a constant current value supplied to the oscillator circuit when the power supply of the charge pump circuit is started, thereby reducing the charging cycle period.

7. A DC/DC converter charge pump circuit according to claim 3; wherein the circuit for reducing the charging cycle period comprises a pre-driver circuit of the charge pump circuit having a current limiting element for limiting current flowing in the charge pump circuit when the power supply is started.

8. A charge pump circuit having a rush current limiting function, comprising: an input terminal for receiving an input voltage; an output terminal for outputting an output voltage; an output capacitor connected to the output terminal; a charge pump circuit connected between the input and output terminals for boosting the input voltage; and a current limiting circuit connected between the input and output terminals for performing a current limiting operation by limiting a rush current flowing in the charge pump circuit and charging the output capacitor when a power supply of the charge pump circuit is initially started, and stopping the current limiting and charging operations when the output voltage reaches a predetermined value.

9. A charge pump circuit according to claim 8; wherein the current limiting circuit comprises a switching element disposed between the input and output terminals, and a feedback circuit connected between the output capacitor and the switching element for preventing the charge pump circuit from operating when the power supply is initially started by controlling the switching element to charge the output capacitor from the input power supply and permitting the charge pump circuit to operate when the voltage of the output capacitor reaches a predetermined value, to thereby limit a rush current from flowing in the charge pump circuit.

10. A charge pump circuit according to claim 9; wherein the switching element comprises a current limiting transistor, and the feedback circuit comprises a detection resistor connected to the output capacitor for producing a detection voltage, a reference voltage, and a comparator for comparing the reference voltage and the detection voltage and outputting a comparison signal for preventing operation of the charge pump circuit by turning on the current limiting transistor until the detection voltage reaches the predetermined value.

11. A charge pump circuit according to claim 8; wherein the charge pump circuit is a DC/DC converter charge pump circuit having a pumping capacitor, a PFM control circuit for charging the pumping capacitor during a charging cycle and having an oscillator circuit which controls the charging operation of the pumping capacitor by changing a frequency of a charging control signal while maintaining a constant pulse width thereof, and discharges the pumping capacitor to an output capacitor during a discharging cycle.

12. A charge pump circuit according to claim 11; wherein the current limiting circuit reduces the charging cycle period at the time of starting the charge pump circuit to reduce the rush current.

13. A charge pump circuit according to claim 11; wherein the current limiting circuit comprises a second oscillator circuit which produces a shortened charging cycle period when a power supply of the charge pump circuit is initially started.

14. A charge pump circuit according to claim 11; wherein the current limiting circuit changes an output pulse of the oscillator circuit when the power supply of the charge pump circuit is initially started.

15. A charge pump circuit according to claim 11; wherein the current limiting circuit comprises a constant current source which changes a constant current value supplied to the oscillator circuit when the power supply of the charge pump circuit is initially started, thereby reducing the charging cycle period.

* * * * *